Jan. 23, 1962  A. J. SCHOLTES  3,017,734
PICKING SPINDLE FOR COTTON PICKER
Filed June 2, 1960  2 Sheets-Sheet 1
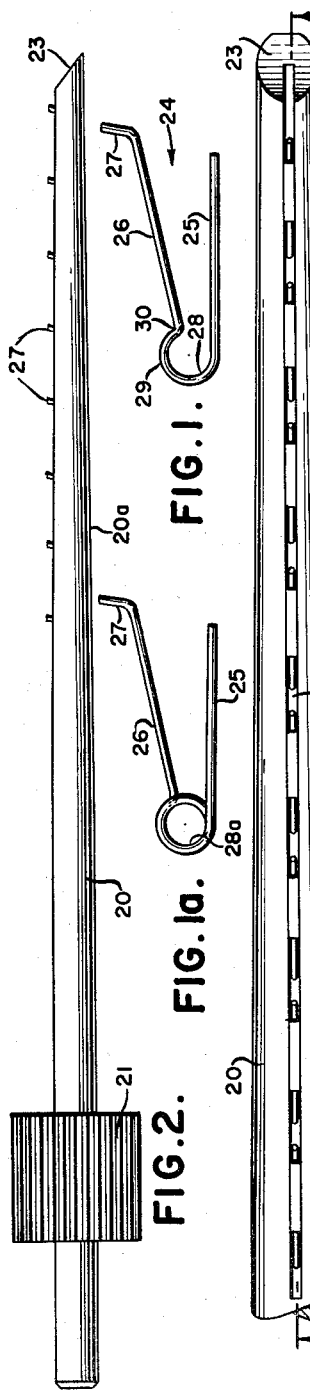
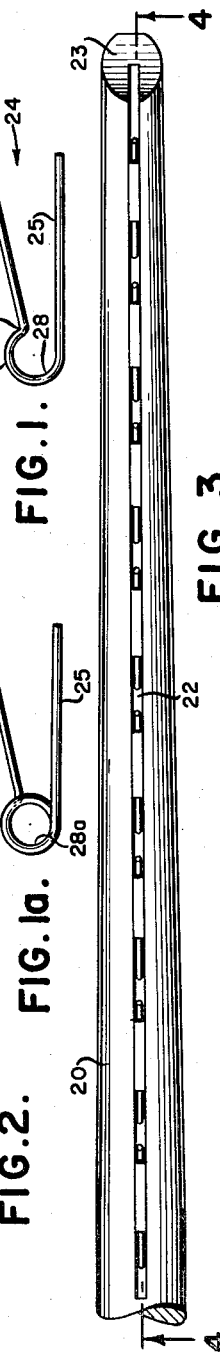
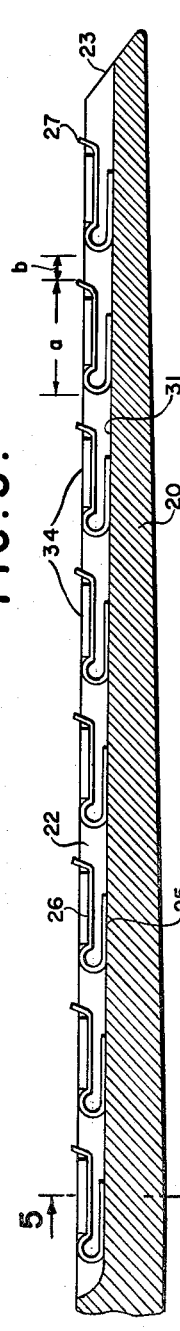
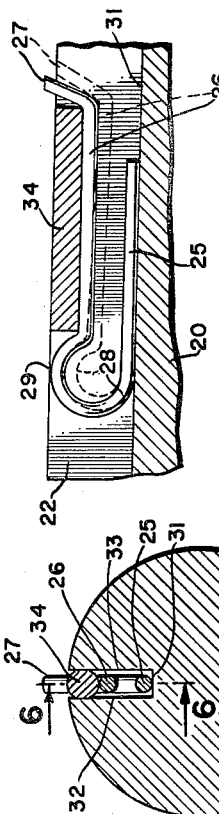
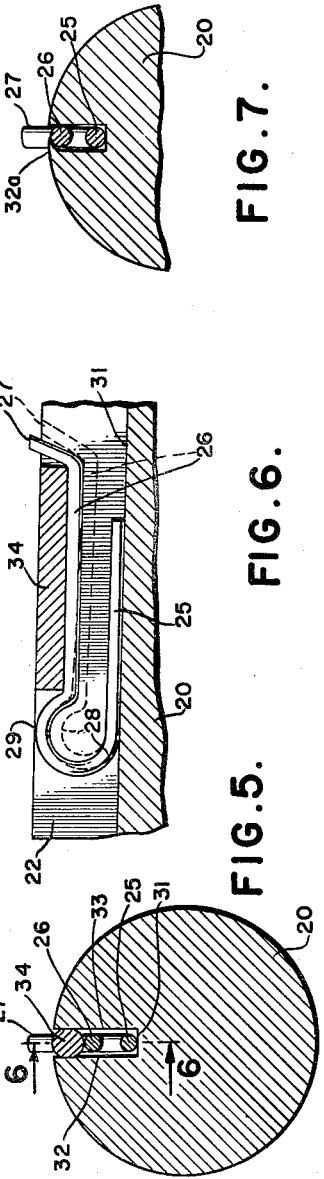
INVENTOR
Albert J. Scholtes
BY Mawhinney & Mawhinney
ATTORNEYS

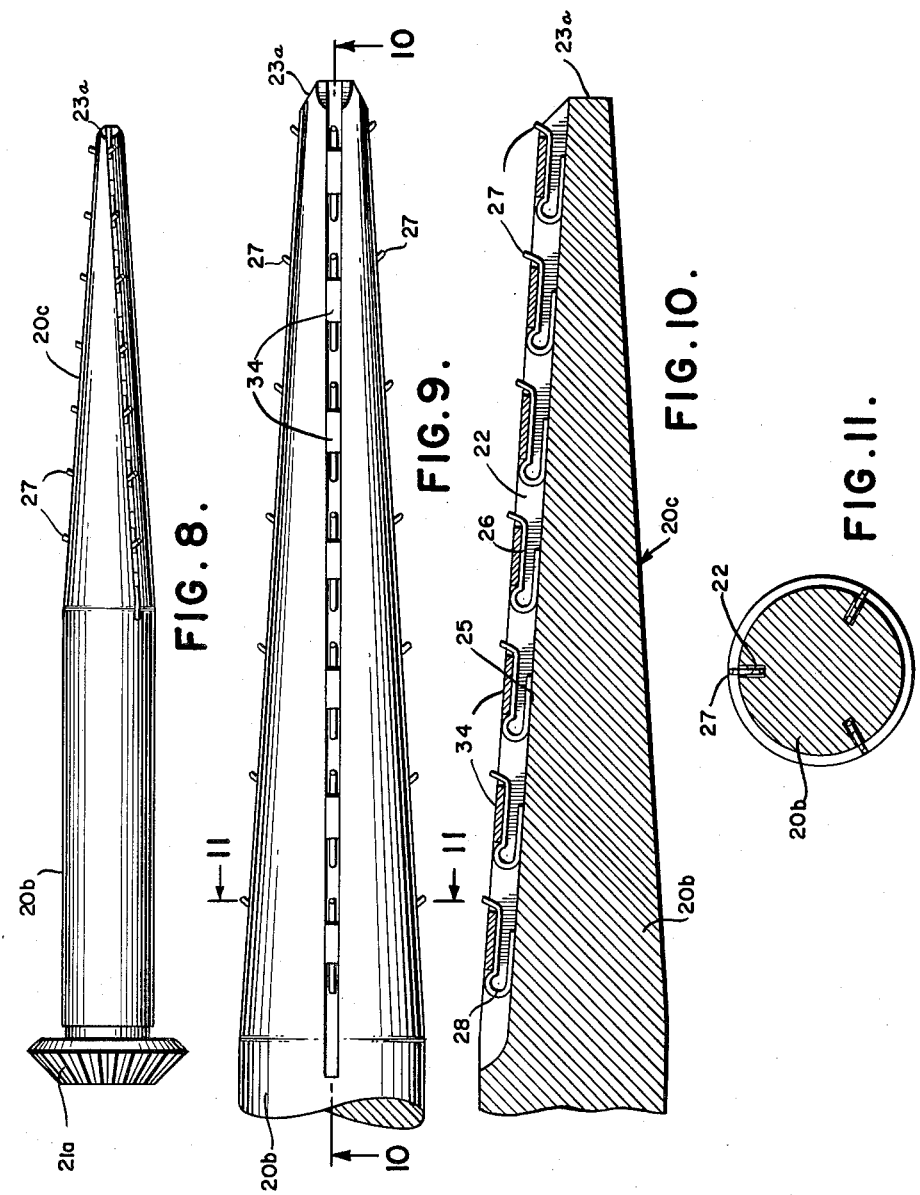

United States Patent Office 3,017,734  
Patented Jan. 23, 1962

3,017,734  
PICKING SPINDLE FOR COTTON PICKER  
Albert J. Scholtes, 714 Ohio Ave., Corpus Christi, Tex.  
Filed June 2, 1960, Ser. No. 33,435  
11 Claims. (Cl. 56—50)

The present invention relates to picking spindle for cotton picker and has for an object a picking spindle suitable for use in cotton picking machines of the type marketed by Allis-Chalmers, John Deere, McCormick, Massey Harris, Case and Rust, et cetera.

An object of the invention is to provide a novel form of spindle and a novel form of barb unit with a novel form of mounting means for such units in the spindle to the end that with a dry spindle improved results are secured in catching the lint, pulling it from the open boll, avoiding spindle boring of the stalks of the cotton plants or green bolls, and in general operating the spindles without injury to the plants.

It is another object of the invention to provide a spindle, barb unit, and attaching means which may be washed, lubricated against oxidation or otherwise treated with liquids without deterioration of any parts of the spindle, units and attaching means in that the use of rubber, rubber substitutes and other material subject to attack by water, oils and other liquids are eliminated.

The foregoing object is important in that seasonally when saps are running high in the cotton plants, such sap is apt to exude and coat the outer surfaces of the spindles, necessitating washing and chemically treating the spindles to remove the sap.

A further object of the invention is to provide a novel form of barb unit in which the barbs are so mounted as to require only slight pressure to depress the same within the confines of the spindle, thus providing easy stripping or doffing.

A still further object of the invention is to provide a spindle offering better protection to the barbs to prevent damage thereto at the stripping or doffing station.

Another object of the invention is to provide a spindle possessing resilience of a substantially solid character slotted to receive a number of the barb units with attaching means by which the units are held against axial movement or casual displacement, at the same time being free to exercise a delicacy of spring movement which will permit the slight radial movement of the barbs necessary to project and depress them out of and into the slot.

It is a further object of the invention to provide a stronger spindle because of its formation of solid material and due to the construction of the spindle and barb units right and left spindles are not required as the spindle of the invention will operate in either rotation direction, and furthermore while the barb units are of great delicacy in action, they admit of being stripped with rubber stripping elements, the barb units being capable of replacement to renew the spindle.

The invention also has for its objects to produce a spindle at less cost due to case hardening and a combination of spindle and barb units capable of being assembled by automatic methods.

An important object of the invention is to provide a resilient barb unit of such great delicacy in action that it will not tear cotton length fiber and will not devalue the cotton.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of a form of barb unit employed in connection with the present invention;

FIGURE 1A shows a modified form of barb unit;

FIGURE 2 is a side elevational view of one form of spindle with which the invention may be used;

FIGURE 3 is a plan view of the same with parts broken away;

FIGURE 4 is a longitudinal sectional view taken on the line 4—4 in FIGURE 3;

FIGURE 5 is a cross sectional view, taken on an enlarged scale, on the line 5—5 in FIGURE 4;

FIGURE 6 is a fragmentary longitudinal sectional view taken on a magnified scale through the spindle, broken away, and its slot with one of the barb units in place therein, together with a form of locking bar shown in section;

FIGURE 7 is a cross sectional view similar to FIGURE 5 with the spindle broken away and showing a modified form of locking means;

FIGURE 8 is a side view of a spindle of a different type to which the invention is adapted;

FIGURE 9 is a plan view of the same broken away at the left end;

FIGURE 10 is a longitudinal sectional view taken on the line 10—10 in FIGURE 9, and FIGURE 11 is a cross sectional view taken on the line 11—11 in FIGURE 9.

Referring more particularly to the drawings, and for the present to FIGURES 1 to 7 inclusive, 20 designates generally a spindle having a knurled drive roller 21.

Pursuant to the invention, the spindle is provided with a substantially radial slot 22 opening through the external wall thereof and through the free beveled end 23.

Into this slot is introduced a suitable number of barb units 24. In a form of the invention as illustrated in these figures, the barb unit comprises an inner or base arm 25 and an outer arm 26 which carries the barb 27 at its free end. These two arms 25 and 26 are hinged together at one end and with the hinge is associated a spring biased to open the arms, that is, to move the arms away from one another. The hinge and spring may be combined into a single member, namely, a spring loop 28, helix 28ᵃ or the like, which in the instance shown is a continuous part with the arms 25 and 26, the same being preferably all made from a single length of resilient wire of round or other desired cross section. The inner arm 25 may extend at substantially a tangent to the loop but the upper arm is connected with the loop nearer the center thereof and below an upper portion of the loop which may be identified as a hump 29. This formation creates a crimp 30 connecting the loop hump 29 with the outer arm 26. The arms 25 and 26 are unconnected at their ends opposite the loop 28.

The base of the slot is designated at 31 and the side walls at 32 and 33. The spindle 20 is tapered toward its free end, as shown at 20ᵃ, and the base 31 of the slot is inclined to present a substantially constant depth of slot irrespective of spindle taper.

The barb unit 24 is adapted to be placed in the slot 22 with the barb end toward the free tapered end 23 of the spindle and it will be seen that this barb 27 is inclined toward such free spindle end for convenience in doffing or stripping.

When the barb unit 24 is located in the slot 22, the inner arm 25 will engage the base 31 of the slot. The barb unit is preferably made of a continuous length of resilient wire bent to produce the arms 25, 26, the loop 28, and the barb 27. In its unsprung condition the outer arm 26 carrying the barb 27 is biased to an inclined position, as shown in FIGURE 1, and in this condition the barb unit is introduced into the slot. Thereupon a locking bar 34 is forced into the slot 22. This locking bar will preferably be of a length approximating the length between the hump 29 and the barb 27. Such locking bar 34 is of greater diameter than the width between the side walls 32 and 33 of the spindle slot so that such locking bar is distorted in the act of inserting it in the outer portion of the slot; whereby it has two functions, first to depress the outer spring arm 26 to place the same under elastic tension and in the second place to lock the barb unit 24 in the slot with only the tip end of the barb 27 projecting.

A successful device has been made according to the following dimensions. The spring wire constituting the barb unit is preferably of .016″ diameter. The crosswise dimension of the slot 22 between the side walls 32 and 33 is preferably .020″ and .104″ deep.

The length $a$ (FIGURE 4) of the barb unit from the outer end of the loop to a line projected from the tip of the barb is 3/8″ and the units are preferably separated a distance $b$ approximately 1/16″ to allow clearance for the barb 27 in moving within the slot incident to the doffing or stripping operation.

While the inner arm 25 rests against the base 31 of the slot, the top of the hump 29 will preferably be even with or slightly below the external surface of the spindle. In the out-sprung position of the barb its tip will extend above the external surface of the spindle approximately .015″ to .020″ but preferably of the order of .015″. The inclination of the barb is preferably in the range of 12½ to 15 degrees off a vertical line running through the junction point between the barb 27 and the outer arm 26.

The spindle 20 is a solid length of steel which is heat treated to provide a hard outside shell with a soft core, rendering the spindle strong and resilient and capable of bending or deflection to avoid breakage when encountering resistant stalks or other obstructions.

Due to dimensions above given, the barb unit 24 will be freely received in the slot 22, as shown in FIGURE 5, there being some slight spacing or tolerance between the sides of the arms 25, 26 and the side walls 32, 33 of the slot 22 so that the resilient action of the barb unit is not interfered with. On the other hand, the greater lateral dimension of the locking bar 34 will enable it to seat tightly within the side walls 32 and 33 of the slot 22. This bar 34 is preferably of stainless steel unhardened wire .026″ in diameter, or at least of a diameter greater than the width of the slot so as to be compressed into the outer part of the slot. The walls of the slot are case-hardened and will not distort, while the bar 34 is relatively soft and will therefore distort when forced into the slot.

As many of the barb units may be installed in the spindle slot as desired, all arranged end to end in slightly spaced relationship with only the barb tips projecting beyond the outer open side of the slot to a very slight distance and with the barbs inclined toward the narrower free tip end 23 of the spindle.

After installation of the barb units in the slots of the spindles and before installing the completed spindles in the cotton picking machines, the outer ends or tips of the barbs 27 are treated to a grinding operation, preferably by a very high speed rotary diamond grinding wheel in order to remove all burrs or other irregularities in the surfaces of the tips, this being for the purpose of avoiding adherence of any lint, called in the industry "tags." It will be understood that the stripping or doffing members of the machine which wipe along the tapered external surface 20ª of the spindle toward the beveled end 23 will encounter the inclined surfaces of the barbs and unless any lint on the barbs is removed in this action, such barbs are depressed within the external surfaces of the spindles and in such position are no longer subject to the doffing or stripping action and it becomes important therefore to produce completely smooth tips and surfaces generally for the barbs so that the initial doffing or stripping action, which at the same time acts to depress the barbs, will at once remove all fibers to prevent the building up of "tags" that would adhere to the spindle and be carried therewith throughout subsequent cycles of operation of the machine with adverse effect upon the product and would in general interfere with the efficiency of such spindle. Also due to the inclined position assumed by the barb in its outermost attitude, a pointed end is exposed directly upward and the grinding operation will remove this point and flatten the upper exposed free end of the barb in a substantially horizontal direction in line with the spindle and in the direction of doffing.

As shown in FIGURE 7, in place of the locking bars 34 the material of the spindle may be staked or offset as appears from one or both sides of the slot walls at their outer portions to partially or fully overlie the outer arms 26 between the loops and the barbs, thus constituting the locking means for confining the barb units in place in the slots and also for acting as stops against which the outer arms 26 may abut due to the reactive elastic action of the loops when the barbs are free subsequent to doffing action. In other words, the locking means may be constituted by portions of the material of the spindles themselves or by the separate bars 34 which are fitted into the slots as heretofore related. The separate bars are preferred in order to avoid distortion of the spindle whereby the same may be re-used and whereby the spindle may be equipped with a new set of the barb units when worn. With the use of the separate locking bars 34 no modification of the spindle is required and it retains its original shape ready to receive replacement barb units at all times.

The locking means, either by the bar 34 or upsetting of the material of the spindle, can merely confine the barb units in place without being the mans of putting the same under elastic tension as in the case where the two arms 25, 26 are substantially parallel in the unsprung condition. In other words, the locking means may function simply to confine the units in place in the slot 22. Additionally, such locking means may function as limit stops to limit the outer movement of the outer arms 26 and the barbs carried thereby due to expansive spring action of the loops 28. And furthermore the locking means may have the third function of placing the loops under elastic tension when the locking means is required to compress or restrict the size of the loops in the act of inserting the locking means outwardly of the outer arms 26.

In use, incident to the rapid rotation of the spindles equipped with the devices according to the invention, the exposed tips of the barbs will encounter the lint and pull the same from the open bolls wrapping the same around the spindles and thence passing to the strippers or doffers which will act to gently slide the accumulated lint off the tapered spindles in the direction of the free narrower ends 23 thereof. Due to the direction of the stripping action the strippers or the cotton moved thereby will encounter the inclined barbs 27 and easily displace the same inwardly through the short distance necessary to remove the barbs from the path of the sliding lint. Due to the resiliency of the loops 28 of the barb units 24 and the slight degree of projection of the barbs 27 outwardly of the outer conic surface of the spindle 20, and due also to the great delicacy of the spring action of the units 24, as composed of this material in this particular form, substantially no harm or damage will be done to the staple of the cotton and valuable long staple cotton may be processed through the picking machine without tearing any of the long fibers which would downgrade the product in the market.

This delicacy of action is illustrated in the enlarged view, FIGURE 6, showing that the barb 27 is at the free end of the outer arm 26 which has the spring loop 28, helix 28ª or the like at its other end, such spring loop, helix or the like furnishing the fulcrum of the spring action. In other words, this fulcrum and spring action are remote from the barb 27, thus allowing long leverage and gentle delicate spring action and yet restoring the barbs firmly to outer position and retaining them in such outer position throughout the cotton harvesting operation in which the leading side edges of the barbs 27 on the rotary spindle catch the lint at a number of spaced points along the length of the spindles to collect the cotton without damage thereto. With the delicate spring action afforded by the barb units 24, rubber or any other type of strippers may be used to doff the cotton.

During doffing or stripping the barbs 27 are depressed inwardly of the slots 22 and in so doing the outer arms 26 are moved inwardly with a consequent constriction of the elastic loops which stresses or further stresses the loops 28 in case they are unstressed in the normal projected position of the barbs. Consequently, the loops are stored with potential energy or greater potential energy and when the doffing station is passed the inherent resiliency in the loops will expand the same until the outer arms abut the locking means 34, 32ª which will limit the degree of projection of the barb tips outwardly beyond the outer surfaces of the spindles.

Referring more particularly to FIGURES 8 to 11 inclusive, these figures show a spindle of a somewhat different type used, for instance, on a McCormick Deering machine in which the spindle is designated at 20ᵇ driven by a miter gear 21ª and having an outer tapered portion 20ᶜ tapering to a beveled end 23ª. The slot 22, barb units 26 and locking bars 34 may be seen in FIG. 10. This type of spindle has a thicker body portion and the taper is on a much greater angle. However, the slot and the barb units are the same except, if desired, more than one slot 22 may be provided in the tapered part of this type of spindle to receive angularly displaced series of barb units. With the type of barb unit according to the invention a single slot equipped with the barb units will suffice.

Although I have disclosed herein the best forms of the invention known to me at this time, I reserve the right to all such modifications and changes as may come within the scope of the following claims.

What is claimed is:

1. A spindle for cotton pickers comprising a substantially solid body having a longitudinal slot open through the outer surface, barb units in the slot comprising barbs and elastic means for yieldably projecting the barbs from the slot, and locking means confining the barb units in place in the slot.

2. A spindle for cotton pickers as claimed in claim 1 characterized by the fact that the spindle body is heat treated to provide a hard outer shell and a soft elastic core.

3. A spindle for cotton pickers as claimed in claim 1 in which the spindle body has a free end beveled to induce sliding off obstacles to avoid destructive boring of plant stalks and green bolls.

4. A spindle for cotton pickers according to claim 1 in which the spindle body is tapered toward its free end at least throughout the area comprised by the barb units and in which the base of the slot is longitudinally sloped to maintain the depth of the slot substantially uniform throughout its length.

5. A spindle for cotton pickers according to claim 1 in which said barbs are inclined in the direction of doffing to be depressed by the doffing member.

6. A spindle for cotton pickers according to claim 1 in which said barb units further comprise inner and outer spaced arms disposed substantially longitudinally of the spindle body, said elastic means connecting the arms at one end, leaving the other ends of the arms free, said outer arms carrying the barbs.

7. A spindle for cotton pickers as claimed in claim 1 in which said barb units further comprise pairs of inner and outer arms, said elastic means comprising resilient loops connected to the pairs of arms at one end thereof, leaving the other ends free, the outer arms carrying said barbs in spaced relation to the resilient loops, said resilient loops biasing the outer arms against the locking means as delimiting stops for regulating the degree of projection of the tips of the barbs outwardly of the slot.

8. A spindle for cotton pickers as claimed in claim 1 in which said barb units further comprise pairs of inner and outer spaced arms in the slots extending longitudinally of the spindle body, said elastic means comprises at least single resilient loops connecting the ends of the pairs of arms, the free end portions of the outer arms carrying the barbs, said outer arms connecting with the resilient loops below outer portions thereof and having crimped portions between the resilient loops and the outer arms, said locking means adapted to overlie the outer arms between the loops and barbs.

9. A spindle for cotton pickers as claimed in claim 1 in which said barb units further comprise pairs of inner and outer spaced arms, said elastic means connecting the pairs of arms at one end, the other ends of the arms being left unconnected, the barbs being on the free end portions of the outer arms, said locking means overlying the outer arms and limiting the outward movement of the outer arms and entrained barbs incident to the expansive action of the elastic means.

10. A spindle for cotton pickers as claimed in claim 9 in which the elastic means biases the outer arms in an unsprung condition to locations subsequently occupied by the locking means whereby in installing the locking means the outer arms, barbs and elastic means are placed under elastic tension.

11. A spindle for cotton pickers as claimed in claim 9 in which portions of the resilient loops stand up as humps above the connections of the outer arms thereto, said locking means located between said humps and the barbs.

References Cited in the file of this patent

UNITED STATES PATENTS

| | | |
|---|---|---|
| 931,926 | Houghton | Aug. 24, 1909 |
| 1,780,497 | Miller | Nov. 4, 1930 |
| 2,667,725 | Voigt | Feb. 2, 1954 |
| 2,667,726 | Vogel | Feb. 2, 1954 |
| 2,720,072 | La Rue | Oct. 11, 1955 |
| 2,787,110 | Call | Apr. 2, 1957 |
| 2,832,186 | La Rue | Apr. 29, 1958 |